Nov. 27, 1923.
J. E. KARL ET AL
OIL GAUGE FOR INTERNAL COMBUSTION ENGINES
Original Filed July 27, 1920
1,475,268
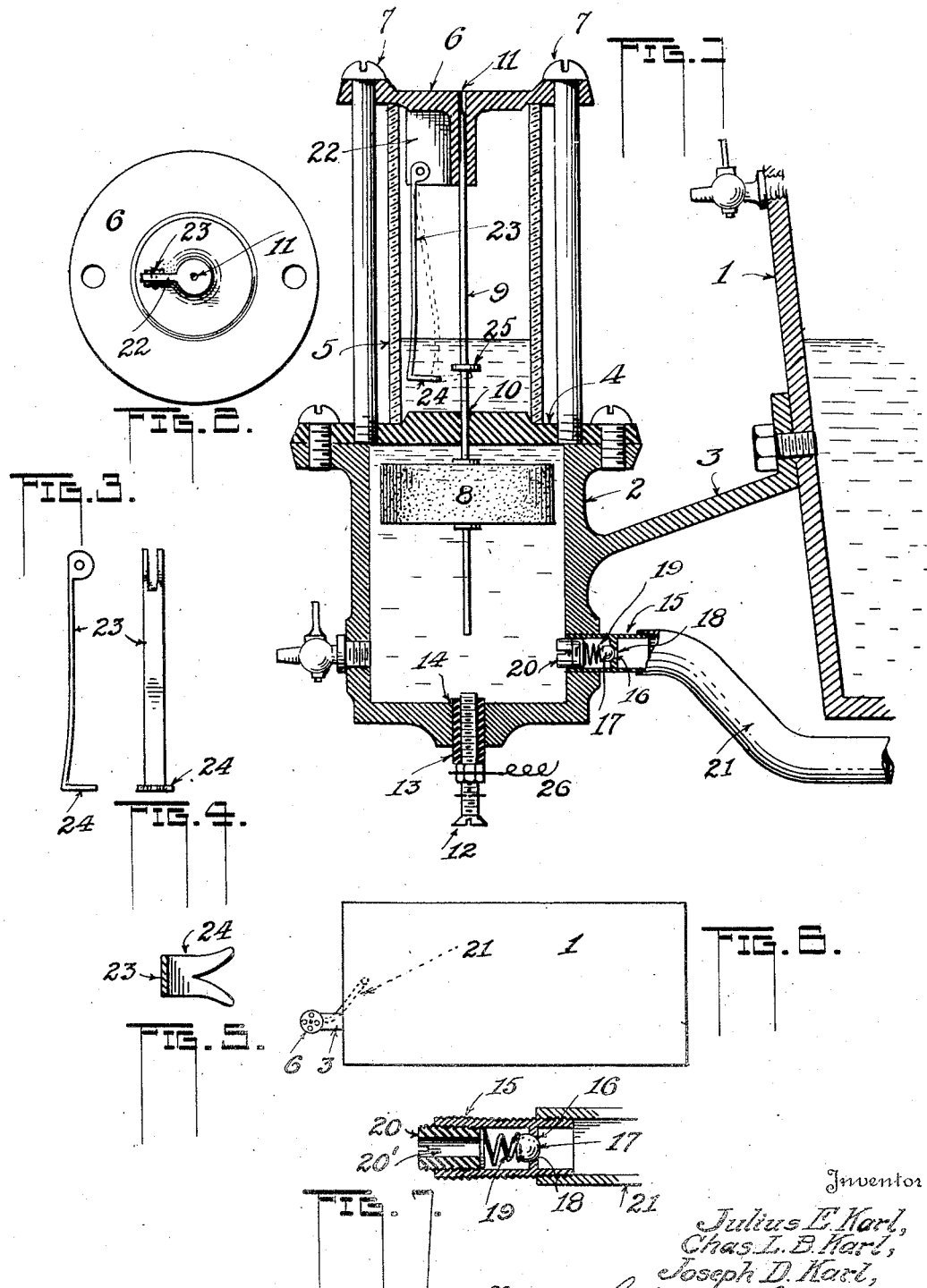

Patented Nov. 27, 1923.

1,475,268

UNITED STATES PATENT OFFICE.

JULIUS E. KARL, CHARLES L. B. KARL, AND JOSEPH D. KARL, OF PEORIA, ILLINOIS.

OIL GAUGE FOR INTERNAL-COMBUSTION ENGINES.

Application filed July 27, 1920. Serial No. 399,402. Renewed October 16, 1922. Serial No. 594,790.

*To all whom it may concern:*

Be it known that we, JULIUS E. KARL, CHARLES L. B. KARL, and JOSEPH D. KARL, citizens of the United States, residing at Peoria, in the county of Peoria and State of Illinois, have invented certain new and useful Improvements in Oil Gauges for Internal-Combustion Engines; and we do hereby declare that the following is a full, clear, and exact description of the invention, which will enable others skilled in the art to which it appertains to make and use the same.

This invention relates to an oil gauge of that class employed indicating, visually, the level of oil in the crank case of an internal combustion engine of motor vehicles, and combining means for automatically "shorting" the ignition system of the engine when the oil level falls below a predetermined point.

The object of our invention is that while the engine is to be automatically stopped by "shorting" the ignition system when the oil has been consumed and its level falls to a point in the crank case beyond which it would be unwise to run the engine, said "shorting" cannot occur should the gauge be drained of oil from any other cause.

Gauges for automatically stopping the engine due to low oil level have been employed heretofore, but to our knowledge they have not included mechanism by which this last named object is accomplished.

The connection of the gauge with the crank case usually such that when the vehicle is standing or moving upon surface other then level, or even for some other reason, the said gauge becomes partially drained if not entirely so, being refilled as the oil seeks its level when normal conditions are restored. Under such conditions however when a float in the gauge is used to cause the shorting, and is free to rise and fall, the engine stops under the condition just named, and when least expected when, in fact, there is sufficient oil in the crank-case to answer for a long time.

That is to say, when the vehicle is moving down a hill, more or less long, or when said vehicle is left standing on a hill with its front end lower than the rear, or when the vehicle is turning a corner at a good speed, the degree of inclination of the vehicle in the former case, or the speed of travel in the latter, throwing the oil by centrifugal action, will often drain the gauge as stated, with a resulting "shorting". This shorting of the ignition circuit is prevented, however, by the use of the means to be described, herein and shown in the appended drawing. And while we have illustrated a preferred manner of accomplishing the desired end, we wish it understood that other ways of seeking this result may be employed without departing from the spirit and intent of the invention.

Figure 1 is a sectional elevation of our improved gauge applied to an engine crankcase.

Fig. 2 shows the under side of a portion thereof.

Figs. 3 and 4 show a side and front elevation, respectively, of a gravity-operated claw.

Fig. 5 is a horizontal section of the claw shown in Fig. 3.

Fig. 6 is a plan, more or less diagrammatical in nature, of an engine crank-case showing the location of our device with respect thereto, and Fig. 7 is a longitudinal section of a check-valve structure.

1 represents the crank-case of the engine, not shown. 2 is a casting in the form of an open-top receptacle from which extends a bracket 3 for attachment to the crank-case in any suitable manner. The upper open side of the receptacle is preferably flanged and receives a closure 4 secured thereto. 5 is a gauge glass resting on the closure surmounted by a cap 6, the glass being secured in position between the cap and closure by screws 7, for example, passing through both the latter and threaded into the said closure, any suitable manner of preventing leakage of oil under the glass being open for use.

8 is a float within the receptacle 2 through which extends a rod 9, the two being secured relatively in any suitable manner, though made adjustable with respect to one another if desired, the rod extending from both sides of said float.

Said rod extends through a hole 10 in the closure 2 and at its upper end into a guide-hole 11 in the cap 6.

The lower end of the rod extends downwardly within the receptacle and in one of the positions of the float is designed to contact with a screw 12 adjustable within an insulating sleeve 13 secured in and closing a hole 14 in the bottom of said receptacle.

Secured in the side of the receptacle is a nipple 15 having a valve-seat 16 in which a ball-valve 17 is adapted to normally rest, being held thereupon to close the opening 18, except as later to be described herein, by a spring 19 adjusted for pressure by a screw 20, provided with a bore 20', threaded into said nipple.

21 is a pipe connecting the nipple with the crank-case at its under side, preferably substantially central of the latter, Fig. 6.

Cast with the cap 6 is a lug 22 depending within the glass 5, and 23 is a depending arm pivotally hung therefrom provided at its lower free extremity with a claw 24 created by bifurcating the said free end of the arm and bending it at right angles whereby when it swings toward the float-rod 9 it will engage beneath a button or disk 25 on said rod for a purpose that will appear presently.

Since the device is attached to the engine it forms one terminal of the ignition circuit not shown in its entirety.

A conduit 26 also a part of the ignition circuit is connected with the screw 12 which is insulated from the body 2 by the sleeve 13 so that when the float-rod 9 contacts with the latter the operation of the motor or engine must be terminated.

The oil in the crank-case naturally seeks its level in the receptacle 2, readily passing the valve 17, and it may enter the glass 5, as well, through the aperture 10 of the closure 4, which aperture may be more or less free to the passage of the oil therethrough.

When a vehicle employing a gauge and a "shorting" mechanism as heretofore used is moving over or is standing upon comparatively level surfaces, the float 8 lies in the upper portion of the receptacle with its contact portions separated, provided, of course, that there is sufficient oil in the crank-case, this being likewise true when standing upon or moving down a hill which is not so steep as to cause too much of the oil to drain out of the gauge.

But upon a steeper incline the oil is likely to drain away, letting the float down. The engine, if running, is thus stopped when, as a matter of fact, the conditions with regard to sufficiency of oil do not warrant it. Or, if the vehicle is left standing on the hill so that the oil can drain away from the float the engine cannot be started without restoring the proper starting condition by disconnecting the circuit closed through such gauge.

In our device the arm 23 with its claw 24 is employed to hold the rod 9 from contacting with the screw 12 under the conditions just named. That is to say, said arm is suspended at the rearward side of the device and rearwardly from the said rod 9 so that when the vehicle is inclined downwardly at its forward end, the claw will fail by gravity toward the rod, its claw being carried beneath the button or disk 25, preventing the float falling so far as to short the ignition circuit.

We provide the valve 17 so that the oil will be retained in the receptacle, however, for a considerable length of time, merely allowing it to seep past it by slightly scoring the valve or its seat so that in the neighborhood of about five drops per minute may pass toward the crank-case. By this means, it will be seen, the oil while having easy access to the gauge cannot leave it except quite slowly. Thereby, when moving down hill unless of very great extent the oil will never be entirely drained from such gauge; but if such should occur, or if the machine is left standing on the hill, and draining becomes complete, the claw will have engaged beneath the button or disk 25 preventing short-circuiting so that the engine can be readily started at any time. If, however, the button is below the claw, having fallen due to consumption of oil, at the time the vehicle is about to be inclined it will be but a matter of a few minutes, in any event, when oil will have been returned to the crank-case to restore the proper level. The disconnection of the conduit 26 will at such times permit the engine to be started.

The arm 23 is preferably so hung that its center of gravity will be slightly rearward from its point of support on the cap in order that it will not readily engage the disk due to vibration and jolts in the ordinary travel of the vehicle and yet will easily move forward under the condition already named.

If during the seeping of oil toward the crank-case the claw has engaged the disk and suspends the float above the oil, such float will be released as the oil level again rises.

Evidently, in moving up hill or when standing with the forward end of the vehicle headed in that direction the gauge will not be drained. It is when directed in the reverse direction under the condition explained that the control of the float is required.

In turning a sharp corner or curve under speed, the oil in the crank-case under ordinary conditions is thrown outwardly, lowering the oil level, and at such times the gauge will often be drained for an instant but just long enough to let the float lower, causing a "short" when least intended or expected. Our valve 17, however, prevents such an occurrence due to the slow leakage provided.

The float and its rod may be so adjusted that contact of the latter with the screw 12 may occur for any desired oil level but preferably the said screw is adjusted for the purpose.

Since the device is rearward of the crank-case and the arm is at the rear of the rod 9, the action of said arm is only required when the crank-case tilts forward.

When tilting toward the rear as when moving up-grade the oil will of course lift the float higher. If the vehicle may chance to tilt laterally in either direction, be it ever so far, the float will not be affected because of the fact that the receptacle 2 is connected with the middle of the crank-case by the pipe 21 and the amount of oil will never be so little as to expose said pipe. The device, therefore, is always ready to perform its work but can never "short" except when the oil has been consumed and the amount left in the crank-case is so little as to make it unwise to operate the engine.

We claim:

1. The combination with the ignition system of an internal combustion engine and an oil gauge including a float mechanism arranged to control said system, of means to automatically engage part of said float mechanism to suspend the float as the oil level falls.

2. The combination with the engine crank-case of a motor vehicle, an ignition system, and a ground circuit including a float mechanism adapted to "short" said system when the oil lever falls below a predetermined point, of means to automatically engage the float mechanism to suspend the float when the crank-case tips with the vehicle for preventing shorting of said system.

3. The combination with the engine of a motor vehicle, its ignition system, and an oil float mechanism in control of and adapted to "short" said system when the oil level falls, of means to automatically engage the said mechanism for holding the descent of the float.

4. The combination with the ignition system for the motor of a horseless vehicle, an oil gauge, and float mechanism therein arranged and adapted to "short" said system for stopping the motor when the oil level falls to a predetermined point, of means adapted by gravity to engage such float mechanism as the motor tips to suspend the same regardless of the position of the oil level in said gauge.

5. The combination with the ignition system for the motor of a horseless vehicle, an oil gauge, and float mechanism therein including a contact point adapted to "short" said ignition system, of a suspended member adapted by gravity to move toward and engage the mechanism when the motor tips for suspending such mechanism clear of the contact point without respect to the oil level in said gauge.

6. In combination with a motor ignition system, an oil gauge, a float therein including a conductor carried thereby, and a terminal with which said conductor is adapted to have contact when the oil level falls to a predetermined point, of means to automatically engage and prevent the conductor from contacting with said terminal regardless of the position of the oil level.

7. In combination with a gas engine and its ignition system, a fluid reservoir communicating with the crank case of said engine and electrically connected with the said ignition system, a float in said reservoir including a conductor for an electric current, an electric terminal insulated from the reservoir and connected with said system, and a gravity-operated member adapted to automatically engage the conductor for preventing its engagement with said terminal.

8. In combination, an engine crank-case, a reservoir communicating therewith, a float in said reservoir including a conductor for electric current, a terminal secured to and insulated from the reservoir for receiving contact of said conductor, an ignition system with which the conductor and terminal are connected electrically, means to automatically engage the conductor for holding it free of the terminal, and a valve between the reservoir and the crank-case in the path of the fluid for governing the flow of the fluid in both directions.

9. In combination, an engine crank-case, a reservoir communicating therewith, a float in said reservoir including a conductor for electric current, a terminal within and insulated from the reservoir for receiving the conductor upon it, an ignition system with which the conductor and terminal are connected electrically, and a valve between the reservoir and the crank-case adapted to permit flow of the fluid past it in both directions the two.

10. In combination with an engine, an ignition circuit and crank case, a ground circuit connected to the ignition circuit, a reservoir connected with the crank-case, a float therein including a conductor, and an electric terminal as part of said ignition circuit, of a part to suspend the float irrespective of the oil level, and a valve between the reservoir and said crank case in the path of flow of the fluid therein, said valve adapted to permit flow of the fluid in both directions but more slowly in one direction than in the other.

11. The combination with an engine and its crank-case, an ignition, a ground circuit connected to the ignition circuit, a reservoir connected with the crank-case, a float therein including a conductor as part of the said ground circuit, and an electric terminal also as part of said circuit, of a gravity operated part to suspend the float irrespective of the oil level, and a valve between the reservoir and said crank case in the path of flow of the fluid therein, said valve adapted to permit flow of the fluid in both directions, but more slowly toward the crank case than in the other direction.

12. The combination with an engine crankcase, a reservoir communicating therewith, and a float in said reservoir including a conductor for electric current, of a terminal fixed with respect to but insulated from the reservoir for receiving contact of said conductor, an ignition system with which the conductor and terminal are connected electrically, means to automatically engage the conductor for holding it free of the terminal, and a valve between the reservoir and the crank case in the path of the fluid for governing the flow of such fluid in both directions, said valve adapted to permit the flow of fluid faster in the direction of the direction of the reservoir than in the direction of the crank case.

13. A device of the nature described including a reservoir for attachment to a fluid container, a contact portion, and a float mechanism in said reservoir, the contact and float mechanism being parts of an electric circuit adapted for closing said circuit, and means suspended on a part of the device to automatically engage and suspend said float mechanism when the device is tipped out of its normal position.

14. A device of the nature described including a reservoir for attachment to a fluid container, a contact portion, and a float mechanism in said reservoir, the contact and float mechanism being parts of an electric circuit adapted for closing the circuit, and an arm free to swing suspended above the float mechanism and including a claw adapted to engage and suspend the mechanism when and as the device is swung from its normal position.

15. A device of the nature described comprising a reservoir for connection with the interior of a fluid container, a float mechanism therein electrically connected to the reservoir, a terminal for an electric current extending into the reservoir, the latter and said terminal being parts of an electric circuit adapted, when one engages the other, to close said circuit, a valve stationed between the reservoir and the container in the path of the fluid for permitting free passage of the fluid in one direction and adapted to permit slow leakage in the opposite direction, and a suspended arm free to swing by gravity when and as the device swings out of its normal position adapted to engage and suspend said float mechanism out of contact with said terminal.

In testimony whereof we affix our signatures in presence of two witnesses.

JULIUS E. KARL.
CHARLES L. B. KARL.
JOSEPH D. KARL.

Witnesses:
VINNIE V. CAILEY,
L. M. THURLOW.